United States Patent [11] 3,631,656

[72] Inventors Gerhard Hausberg
Essen, Bredeney;
Karl-Rudolf Hegemann, Essen,
Bergerhausen, both of Germany
[21] Appl. No. 764,733
[22] Filed Oct. 3, 1968
[45] Patented Jan. 4, 1972
[73] Assignee Gottfried Bischoff Bau Kompl.
Gasreinigungs-und
Wasserruckkuhlanlagen
Ruhrallee, Essen, Germany
[32] Priority Oct. 4, 1967
[33] Germany
[31] P 16 01 122.6

[54] APPARATUS FOR COOLING AND CLEANSING
GAS UNDER PRESSURE
4 Claims, 7 Drawing Figs.
[52] U.S. Cl....................................... 55/257,
55/440, 55/457, 261/117
[51] Int. Cl......................................... B01d 47/08
[50] Field of Search............................55/240–241,
237, 257, 521, 238, 457; 261/79,
108–109, 111–112, 117–118; 55/416, 259

[56] References Cited
UNITED STATES PATENTS
784,748 3/1905 Meehan.................. 261/118 X
787,593 4/1905 Steinbart.................. 55/457 X
1,866,443 7/1932 Zumbro.................... 55/257 X
1,894,744 1/1933 Hawley..................... 55/237 X
1,897,332 2/1933 Raymond................. 55/185 X
2,648,397 8/1953 Ravese et al............. 55/440 X
3,084,918 4/1963 Kohl et al. ............... 261/112
3,140,163 7/1964 Hausberg ................. 55/416 X
3,444,672 5/1969 Alsobrooks .............. 55/416 X
1,655,171 1/1928 Wagner..................... 261/111
2,733,054 1/1956 Ackermen................. 261/117
3,353,799 11/1967 Lions et al. ............... 55/228
FOREIGN PATENTS
323,544 1/1930 Great Britain............. 261/111

Primary Examiner—Frank W. Lutter
Assistant Examiner—Bernard Nozick
Attorney—Karl F. Ross ABSTRACT: An apparatus for cooling and cleansing a compressed gas without significant pressure loss has an unpacked scrubbing tower wherein the gas passes upwardly through one or more water sprays, and thence through a "dryer" downstream of this scrubbing tower. This dryer is an impingement separator, a uniflow cyclone, or both. The tower sustains no substantial pressure loss since its output opening is of substantially the same cross section as its input opening.

Gerhard Hausberg
Karl-Rudolf Hegemann
INVENTORS.

BY

Karl J. Ross
Attorney

Gerhard Hausberg
Karl-Rudolf Hegemann
INVENTORS.

BY Karl F. Ross
Attorney

APPARATUS FOR COOLING AND CLEANSING GAS UNDER PRESSURE

Our present invention relates to a gas-scrubbing apparatus for cooling and cleansing a compressed gas.

Scrubbing towers for cleansing and cooling gases are known which consist of a packed or filled tower with an inlet at the bottom and an outlet at the top and means for introducing a cooling liquid countercurrent to the rising gas stream whereby the packing forms the boundary layers at which intimate contact and heat exchange between the fluids are sustained.

For cleansing and cooling a compressed gas without bringing about a substantial drop in pressure or change in moisture content of a compressed gas, such systems have many drawbacks. Thus, the gas generally undergoes a sizable pressure drop. What is more, a good deal of the wash liquid—usually water—remains in the cleansed gas so that the gas at the output is appreciably more humid than that at the input. Furthermore, contaminated water cannot be used as the liquid.

It is, therefore, the principal object of our invention to provide an improved apparatus which cleanses and cools a compressed gas and which does not bring about a significant pressure drop or change in moisture content of the compressed gas.

The gas-scrubber apparatus of the present invention has an upright unpacked scrubbing tower in which a plurality of axially spaced nozzles spray conical water jets downwardly against the upward flow of a pressurized gas, the spray-cone angle being selected to insure contact of the base of the cone with the wall of the tower above each successively lower spray head. Baffles are provided in the form of downwardly converging frustoconical rings at the base of each spray cone and along the wall of the tower (so as not to block the free space at the center thereof) to render this gas flow as turbulent as possible for maximum cleaning and cooling efficiency.

The tower is divided into two chambers by a partition wall with a constricting opening (of a fraction of the cross section of the tower or its partition) corresponding roughly in cross-sectional size to the input opening in the bottom of the tower. Above this opening, especially when the tower has a height of 5 meters or more, is a honeycomb grid spanning the cross section of the tower below the first nozzle. An impingement separator is provided above the spray zone, the size of the opening afforded by this separator being carefully chosen to avoid excessive pressure drop. The remaining moisture in the cleansed gas is removed here.

According to a second embodiment, a conduit (which may be used in conjunction with the lateral-flow corrugated-plate impingement separator or in place of the latter) leads away from the gas outlet at the top of the tower and has an upright portion wherein a so-called axial separator, e.g. a cyclone or swirl generator, removes moisture from the gas. This uniflow cyclone can be used instead of or in conjunction with the above-described lateral-flow impingement separator, which may use plates of the Peerless line-separator type.

Such an apparatus according to our invention very efficiently cleanses and cools a gas without greatly reducing its pressure or permitting retention of large quantities of water.

The above and other objects, advantages and features of our invention will be more readily apparent from the following description, given with reference to the drawing in which.

Figure 1:
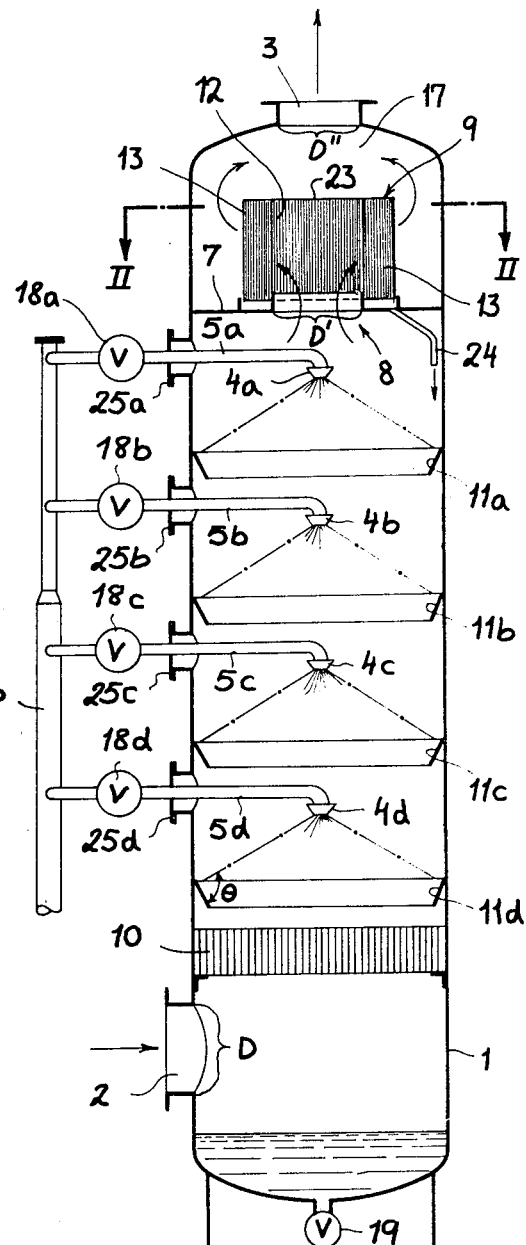
FIG. 1 is an axial section through a scrubbing tower according to our invention.

FIG. 1 shows an unpacked scrubbing tower 1 with a lower inlet opening 2 of circular configuration, having a diameter D, and an upper outlet opening 3 with diameter D'', equal to diameter D. Four rotary-spray heads or nozzles $4a$–$4d$ as disclosed in the commonly owned U.S. Pat. No. 3,140,163 in the name of one of us, are mounted on tubular arms $5a$–$5d$; one over the other along the axis of the tower 1, these arms extending inwardly through sealed ports $25a$–$25d$. Valves $18a$–18 control the pressures of the supplies of wash liquid—preferably cool (and possibly contaminated) water—fed to the spray heads $4a$–$4d$ from the supply pipe 6.

The lower portion of the tower 1 is formed with a plurality of cascaded, vertically superposed washing stages in the form of frustoconical baffle rings $11a$–$11d$ respectively associated with the heads $4a$–$4d$ and located in the horizontal planes of the bases of the spray cones therefrom, the baffles lying along the tower wall to leave free space in the center of the tower. The spray cones produced by the heads $4a$–$4d$ include with the inner surfaces of the downwardly converging baffles an angle $\theta$ of approximately 90° for optimum efficiency. The space between successive baffle rings $11a$, $11b$ etc. is substantially unobstructed except for the intervening nozzle. It will be noted that, owing to the aforementioned wide angle $\theta$, the inner diameter of the lower end of each baffle ring is only slightly less than that of the tower 1.

Above the upper spray head $4a$ is a partition 7 formed with a constricting opening 8 having a diameter D'. For ideal pressure balance, the diameters D, D' and D'' should be approximately equal. Above this opening 8 is a chamber 12 formed by a lateral-flow impingement separator 9 and a metal plate 23.

Figure 2:
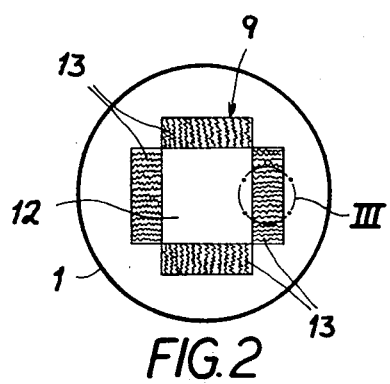
FIG. 2 is a cross section taken along line II—II of FIG. 1.
Figure 3:
FIG. 3 is a detail of the area III of FIG. 2.

As shown in FIGS. 2 and 3, this separator 9 can be prismatic with four blocks 13 of corrugated upright plates 14 standing on their corrugated sides with interleaved (vertical corrugations) so that the spaces between them extend vertically. The width $14a$ of the spaces is less than the depth of the corrugations (measured between a crest and a trough) and is designed to allow the maximum possible amount of gas to flow therethrough while catching the maximum amount of liquid therefrom in accordance with the theories already developed in connection with the "Peerless line separator." Above the separator is a pressure-equalization chamber 17 which serves to compensate minor pressure differentials in the tower 1.

Figure 7:
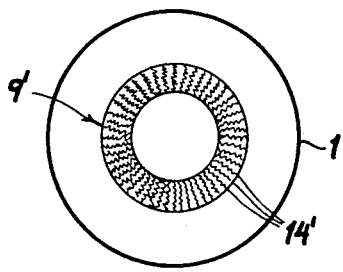
FIG. 7 is a view similar to FIG. 2 of a second embodiment of the impingement separator according to our invention.

FIG. 7 shows an alternative lateral-flow separator 9' of cylindrical configuration with plates 14'. The operating principle is the same as that of the separator 9 previously described.

Figure 4:
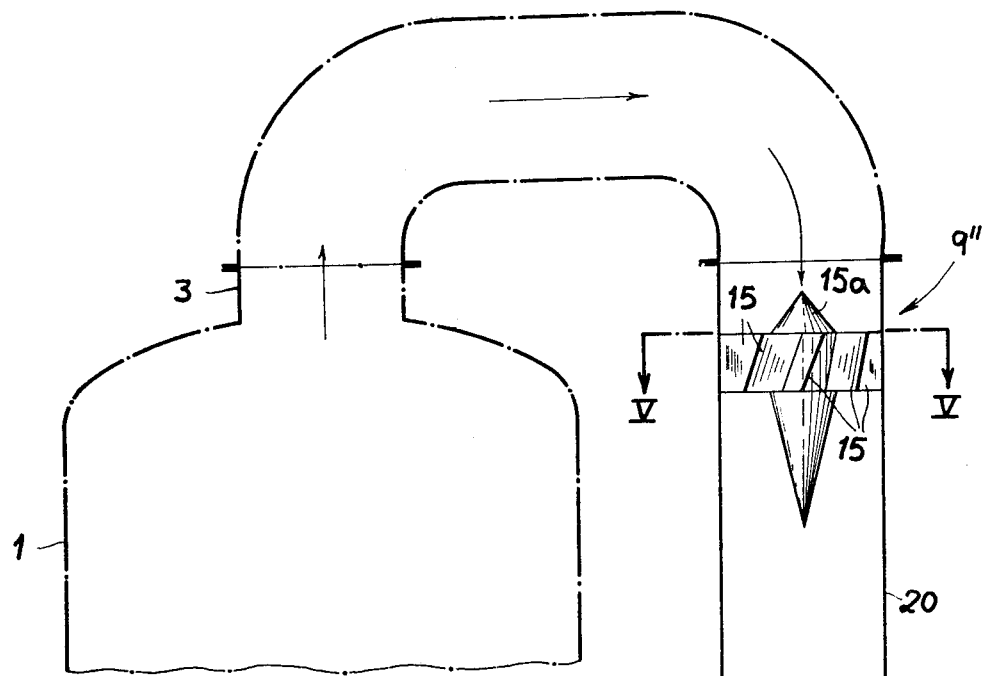
FIG. 4 is a section through a conduit equipped with a uniflow cyclone and usable in conjunction with our invention.
Figure 5:
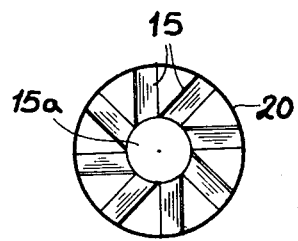
FIG. 5 is a cross section taken along line V—V of FIG. 4.
Figure 6:
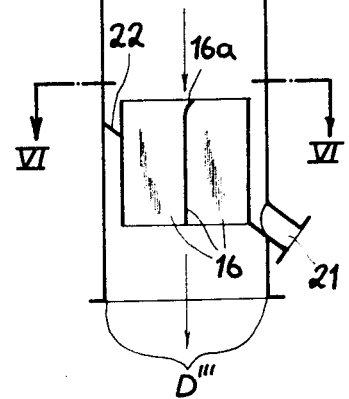
FIG. 6 is a cross section taken along line VI—VI of FIG. 4.
Figure 6:
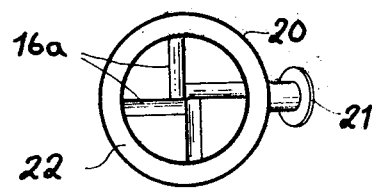

FIG. 4 shows an impingement separator or cyclone 9'' in a conduit 20 leading from the output 3 of the tower 1. This cyclone 9'' comprises a central Venturi body $15a$ with vanes 15 as shown best in FIG. 5. FIGS. 4 and 6 also show plates 16 with turned edges $16a$ which serve as impingement surfaces, along with the walls of the conduit 20 to collect the water driven from the gas passing therethrough. The flow through conduit 20 is rotated about the axis thereof by the vanes 15.

The separators 9 and 9' are usable interchangeably while the cyclone 9'' can be used in addition to or in place of one of them.

Our gas scrubber functions as follows:

Pressurized warm dirty gas enters at 2 and passes through the vertical passages of a honeycomb grid 10 and then rises in the pressure-retaining tower 1. As it does so, water from the spray heads $4a$–$4d$ picks up most of the particles entrained by the gas and falls to the bottom of the tower 1 where it can be drained off at 19. Baffles $11a$–$11d$ create a great deal of turbulence in the rising gas stream so that it mixes best with the water sprayed by the nozzles $4a$–$3d$.

The gas then passes through the opening 8 and through the separator 9 where its pressure and velocity is augmented; the water in it is substantially all caught on the plates 14 and drips down through a drain 24.

After passing through the chamber 17 the gas stream leaves by the outlet 3 and can pass through the conduit 20 of diameter D''' substantially equal to the outlet diameter D''. Here it can be given a swirling movement and speeded up by the cyclone 9'' for separating the remaining water out of it at this point, this water being caught on a plate 22 and drained off at 21.

The preferred use of both the separator 9, which can correspond, for example, to the one shown on page 18–85 of *Perry's Chemical Engineers' Handbook*, McGraw-Hill, New York, 1963, with the uniflow cyclone 9'' (op. cit. p. 20–73) is advantageous in that at low gas velocities the cyclone 9'' will have little effect and therefore bring about little drop in pressure. But at high speeds, and therefore high loads, it will have a notable water-removal effect on the flow passing through it.

The improvement described and illustrated is believed to admit of many modifications within the ability of persons skilled in the art, all such modifications being considered within the spirit and scope of the invention except as limited by the appended claims.

We claim:

1. A scrubber for a stream of gas under pressure, comprising:

an upright cylindrical tower provided with a gas inlet at its bottom and with a gas outlet at its top;

a grid spanning the interior of said tower above said inlet;

partition means with a restricted gas passage spanning the interior of said tower below said outlet;

a plurality of cascaded washing stages vertically spaced between said grid and said partition means, each of said stages including a central nozzle for generating a downwardly diverging spray cone and a downwardly tapering ring extending from the inner wall surface of said tower underneath said nozzle, the space between the rings of successive stages being substantially unobstructed except for the intervening nozzle, the inner diameter of said ring at its lower end being slightly less than the inner diameter of said tower, the cross-sectional areas of said inlet, said outlet and said passage being substantially identical and less than that of said lower end; and separator means in said tower between said partition means and said outlet for removing entrained moisture from the rising gas stream.

2. A scrubber as defined in claim 1 wherein said grid has a honeycomb structure with vertical passages.

3. A scrubber as defined in claim 1 wherein said separator means comprises a chamber closed at the top and peripherally bounded by a multiplicity of upright plates with interleaved corrugations.

4. A scrubber as defined in claim 1 wherein said nozzle comprises a rotary head at the end of a substantially horizontal supply tube.

* * * * *